Feb. 21, 1939.                    R. R. CHAPPELL ET AL                    2,148,188
                                        RECORDER
                                    Filed Oct. 20, 1936                2 Sheets-Sheet 2
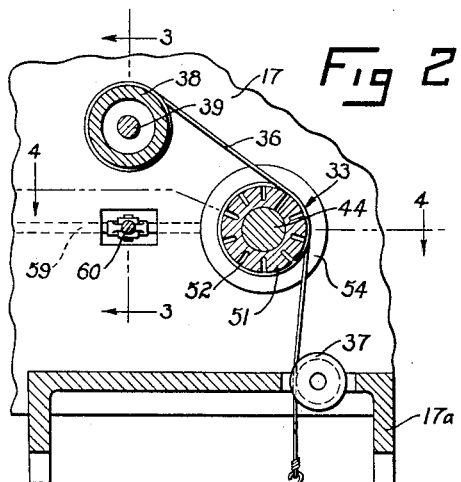
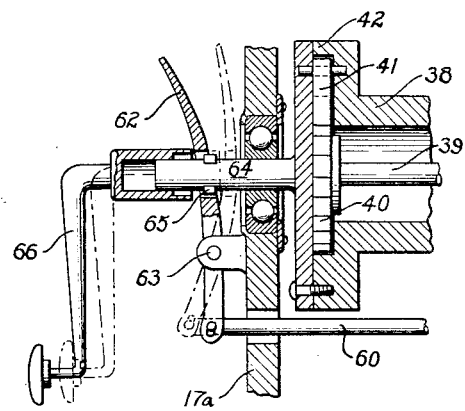
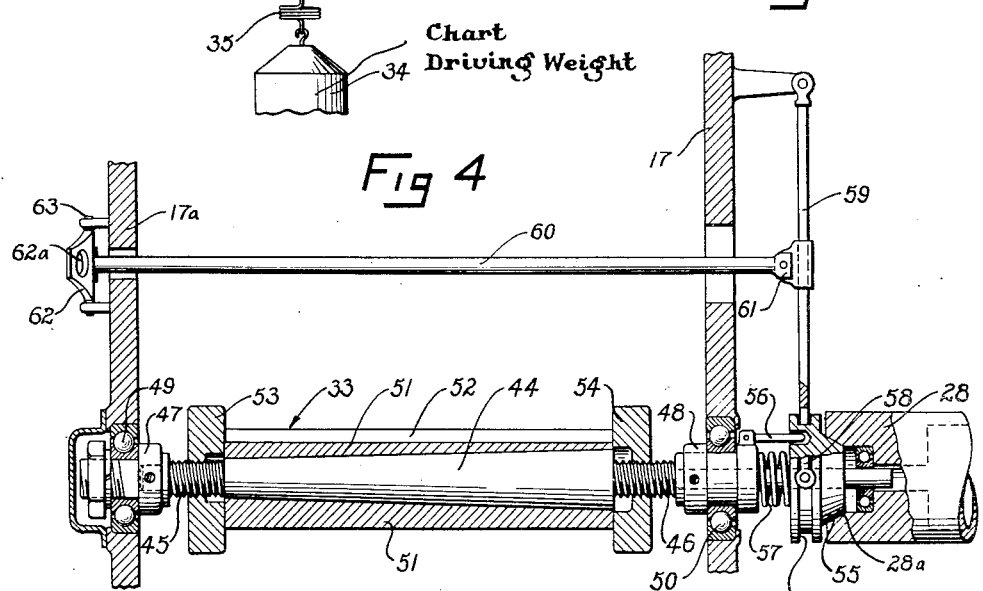
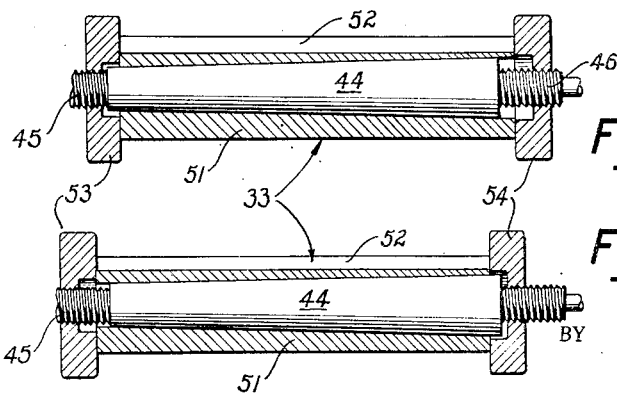
INVENTOR.
RALPH R. CHAPPELL
RUTGER B. COLT
BY
Stephen Cerstvik
ATTORNEY.

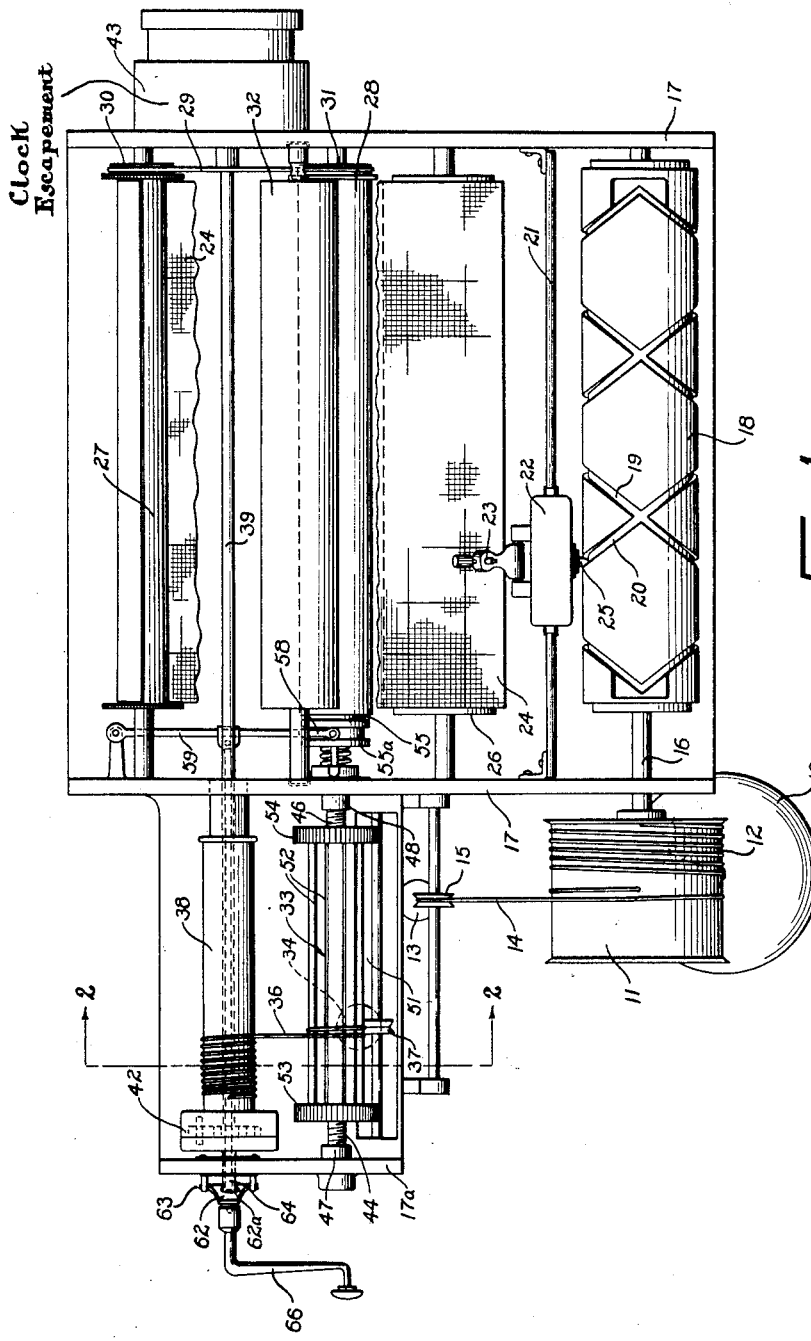

Patented Feb. 21, 1939

2,148,188

UNITED STATES PATENT OFFICE 2,148,188

RECORDER

Ralph R. Chappell, Richmond, Va., and Rutger B. Colt, Baltimore, Md., assignors to Bendix Aviation Corporation, South Bend, Ind., a corporation of Delaware Application October 20, 1936, Serial No. 106,672

2 Claims. (Cl. 234—76)

This invention relates to motion transmitting mechanisms and more particularly to means for controlling the speed transmission ratio in a train of moving parts such as may be employed for driving a record sheet or chart adapted to be used in connection with mechanism for recording forces or movements, for example, the variations in the water level of lakes, rivers, or the like.

Recorders of the general type shown and described herein by way of example comprise a time controlled or constant speed unit and a unit controlled in accordance with a variable force, movement or condition. The time controlled unit is usually constituted by a number of elements operating to advance a record sheet at a uniform linear speed past a line perpendicular to the direction of travel of the sheet while the variable force responsive unit usually comprises a number of elements operating to move a recording stylus along said line and in contact with said sheet in response to changes in the variable. The combined action and cooperation of said units results in the production of a graphic record in rectangular coordinates, the variable being plotted against time on a graduated record sheet or chart. The latter is preferably advanced past the line of movement of the stylus at a uniform speed by some suitable driving means, the speed at which the paper moves being controlled by the speed transmission ratio between a chart driving roller and said driving means.

It has been found in practice that changes in relative humidity in the region where the recording mechanism is to be used cause lengthwise expansion and contraction of the record sheet whereby the number of graph or graduation lines per inch or other unit of measurement longitudinally of the chart changes accordingly. Thus, if the record sheet is moved at the same linear speed under all conditions of humidity, as is done in so far as is known in recorders heretofore provided, it will be seen that a greater or less number of graph lines on the chart pass the recording stylus per unit of time, depending upon whether the record chart is in contracted or expanded condition. Errors in the record accordingly result, the magnitude of said errors being inversely proportional to the speed of the chart. Small, although not immaterial, errors also result in the record produced by prior recorders because of the limitations on the accuracy with which the various elements of the chart driving train may be machined in commercial production, and the consequent inability to obtain the exact overall speed ratio desired, without prohibitive expense.

Accordingly, one of the objects of the present invention is to provide novel means whereby slight or minute variations in the speed ratio of a train of motion transmitting elements may be conveniently made.

Another object of the invention is to provide a driving element for a motion transmitting train which is so constructed that the periphery thereof may be readily and minutely varied in a novel manner.

A further object is to provide novel means in recording mechanism of the above type for energizing the chart driving means without danger of disturbing the position of the chart in any way.

A still further object is to provide a recording mechanism wherein novel means are provided for advancing a record chart at a constant speed relative to a recording stylus.

The above and further objects and novel features of the invention will more fully appear from the following detailed description when the same is read in connection with the accompanying drawings. It is to be expressly understood, however, that the drawings are designed for the purpose of illustration only and are not intended as a definition of the limits of the invention, reference being had primarily to the appended claims for the latter purpose.

In the drawings, wherein like reference characters refer to like parts throughout the several views, Fig. 1 is a somewhat diagrammatic plan view, with parts broken away, of a recording mechanism embodying one form of the present invention;

Fig. 2 is a sectional view, on an enlarged scale and with parts broken away, the section being taken on line 2—2 of Fig. 1;

Fig. 3 is an enlarged detail view, partly in section and with parts broken away, the section being taken substantially on line 3—3 of Fig. 2;

Fig. 4 is a partial plan view on an enlarged scale, partly in section and with parts broken away, the section being taken substantially on line 4—4 of Fig. 2; and, Figs. 5 and 6 are detail views, partly in section and with parts broken away, illustrating the novel speed varying means, Fig. 5 showing the same in expanded position and Fig. 6 showing the same in contracted position.

In the illustrated embodiment of the invention which is shown, by way of example, as being embodied in a water stage recorder, a unit is provided which is responsive to a variable water level, the same comprising a float 10 which is suspended from a spirally grooved float wheel or drum 11 by means of a flexible cable 12, a portion of which is wound around said drum. A counterweight 13 that is somewhat lighter than said float is supported by a cable 14 which is also wound around and secured to drum 11 and which passes over a rotatable and axially movable pulley 15 for the purpose of rotating said drum when the float is lifted by a rising water level. Drum 11 is mounted on a shaft 16 that is rotatably supported in a frame or casing 17. Also mounted on shaft 16 for rotation therewith is a cylinder 18 having a continuous or endless groove cut in the surface thereof, said groove being formed by two oppositely directed, helical grooves 19 and 20 each of which terminates in an intersection with the other adjacent the ends of said cylinder.

Secured to frame 17 adjacent cylinder 18 and extending parallel to the axis of rotation of the latter is a track 21 on which a carriage 22 is movably supported. Said carriage is provided with a recording stylus 23 that constantly engages a record sheet or chart 24 and has a laterally extending portion or guide 25 which engages groove 19, 20. Thus, as cylinder 18 is rotated in accordance with the variable water level, the coaction of guide 25 with the walls of groove 19, 20 causes carriage 22 and stylus 23 to be reciprocated along track 21, the stylus bearing against and marking chart 24 at a distance from the longitudinal edge thereof or other reference line on the chart, which distance is indicative of the position of float 10 and, hence, of the water level. Inasmuch as the detailed construction and operation of the variable force or movement responsive unit above described is well known in the art, it is believed to be unnecessary to show and describe the same in further detail.

In the form shown, chart 24 is constituted by an elongated sheet which is tightly wound on a supply roller 26 that is removably and rotatably mounted in frame 17 in any suitable well-known manner, the mounting therefor being shown diagrammatically in the drawings. In order that the chart will be driven at a uniform linear speed relative to stylus 23 irrespective of the diameter of supply roller 26 or the diameter of a take-up roller 27, also rotatably journalled in frame 17, which diameters vary as the chart is unrolled from the former roller onto the latter, a feed or drive roller 28 is provided for frictionally driving said chart, said feed roller being adapted to be driven at a constant speed by novel driving means to be fully described hereafter. Rollers 27 and 28 are preferably drivably connected together by means of a suitable yielding driving connection, such as by belt 29 which engages pulleys 30 and 31 on the ends of said rollers. To insure against slippage between feed roll 28 and chart 24, a friction roller 32 is provided above feed roller 28, said friction roller being journalled in elongated slots in the walls of frame 17, whereby the same is adapted to rest with the full weight thereof bearing against said feed roller and accordingly to hold chart 24 in close frictional engagement with the latter roller.

Although, in the interest of clarity, the chart is not shown fully installed, the free end of the same is preferably passed downwardly between supply roll 26 and feed or driving roll 28, beneath the latter and thence between the top of the feed roll and the bottom of friction roll 32. It is then passed over the top of said friction roll and secured to take-up roll 27. The latter is preferably removably mounted in frame 17 and may be of any of various well-known, suitable or desirable constructions designed for this purpose.

By plotting a variable, such as the water level of a stream, against time, a record which is very valuable in many studies may be obtained and in order to obtain such a record the movement of the record sheet should be correlated to the time of day or night so that the recorded value of the variable at any desired instant of time may be determined and, vice versa, so that the time at which a given condition of the variable existed may be determined from the chart. The movement of feed roller 28 and, hence, of chart 24 is accordingly controlled and maintained constant by a clock or other constant speed mechanism, whereby a predetermined length of chart 24 or a predetermined number of graduations thereon move past the line of movement of stylus 23 during each unit of time. For the purpose of rendering the record readily readable, the chart is preferably constituted by cross section paper, or paper graduated in terms of time in some other manner, so that the distance between lines or graduations extending perpendicular to the direction of movement of the chart is indicative of the chart movement for a predetermined period of time, such as one hour, for example. Thus, to obtain an accurate record of the variable with respect to time when employing a chart of this character, the speed of movement of the latter must be varied with the lengthwise expansion and contraction of the chart which results from variations in relative humidity, so that a given number of graduation lines will pass under the recording stylus each day or other period of time.

It is not feasible to adjust the clock escapement or other speed control mechanism, which is calibrated at the factory for average conditions, in order to produce the small variations in the speed of chart 24 necessitated by the above variations in the length of the chart, by small inaccuracies in the machining of the parts, or by the desire to use a record chart which is graduated on a different scale from that for which the recorder is set at the factory, for example, a chart graduated on the basis of centimeters instead of inches. Novel means for driving feed roll 28 are accordingly provided whereby minute changes in the speed thereof and, hence, of chart 24 may be quickly and accurately made without the exercise of special skill.

Said feed roll driving means, in the form shown, comprises a novel expansible cylinder 33 which is rotatably supported by frame 17 and a laterally extending portion 17a thereof. Said cylinder is drivably connected to feed roll 28 in a manner to appear more fully hereafter and is adapted to be rotated by a gravity operated weight 34 suspended from said cylinder by means of a coil spring 35 (see Fig. 2) and a cable 36. The latter proceeding from weight 34 passes over a rotatable and axially movable pulley 37, and is wound only once around cylinder 33 thereby permitting free expansion thereof under adjustment while the device is assembled. The remainder of said cable is wound around an auxiliary drum 38 which is rotatably mounted on frame 17, 17a concentrically with a shaft 39, said drum being adapted to drive said shaft in one direction only, through the medium of a pawl 41 pivotally mounted in an enlarged portion 42 of drum 38 (Fig. 3) which cooperates with a ratchet wheel 40 on said shaft. The rotational movement of shaft 39 and, hence, the speed of drum 38, cylinder 33 and feed roller 28 is controlled by a clock escapement or other suitable constant speed means, shown diagrammatically at 43, (see Fig. 1) said means being effective to control the speed at which weight 34 is permitted to descend. Roller 28 and, hence, chart 24 are thus adapted to be driven at uniform speed. It will be noted that the above driving mechanism for roller 28 is constituted by clock means wherein the gravity operated weight 34 corresponds to the mainspring ordinarily employed in modern clock mechanisms. Weight 34 thus constitutes driving means for chart 24 which is adapted to be controlled by the escapement mechanism 43.

In order to vary the speed ratio of the driving train and, hence, adjust the speed of the chart, cylinder 33 is novelly constructed so that the diameter thereof may be minutely varied, it being seen that the smaller the diameter of said cylinder the greater will be the angular speed thereof for a given rate of descent of weight 34. In the embodiment illustrated, cylinder 33 is constituted by a tapered, cone-shaped mandrel 44 having axially extending journals 45 and 46 secured thereto or formed integrally therewith, enlarged portions of said journals adjacent said mandrel being threaded and the reduced ends thereof being drivably connected and fastened such as by means of set screws, to the inner races 47 and 48 of ball bearings 49 and 50. Surrounding mandrel 44 and slidably mounted thereon is a resilient hollow, split expansible sleeve 51 having a tapered bore for engaging the surface of the mandrel and a cylindrical periphery which is provided with a plurality of longitudinally extending radial slots 52 one of which, as shown in Fig. 2, extends completely through the hollow sleeve. Said plurality of longitudinally extending slots makes it possible for the expansible sleeve 51 to expand uniformly throughout its circumference upon insertion of the mandrel as will be set out later. It will thus be seen that if sleeve 51 is moved to the right on mandrel 44, as viewed in the drawings, the peripheral surface of the sleeve will increase, and such increase is distributed about its periphery due to the large number of slots therein uniformly distributed about said periphery, whereas movement of the same to the left will result in a like decrease in the periphery thereof by reason of the resilient construction.

To effect and facilitate such longitudinal movement of sleeve 51 on mandrel 44, a pair of cylindrical nuts 53 and 54 are provided on the threaded portions of journals 45 and 46, respectively, the inner faces of said nuts being adapted to engage the ends of sleeve 51 and preferably have centrally disposed recesses therein for receiving the ends of mandrel 44. Thus, when it is desired to increase the outside diameter of sleeve 51, nut 54 is moved several threads to the right and nut 53 is manipulated so as to advance to the right on its cooperating threaded portion of journal 45, thereby abutting against the left end of sleeve 51 and moving the latter until the right end thereof bears against nut 54. On the other hand, if it is desired to decrease the outside diameter of the sleeve, nut 53 is manipulated so as to move the same a few threads to the left and then nut 54 is rotated until sleeve 51 bears against nut 53. Sleeve 51 is shown in an expanded position in Fig. 5 and in a contracted position in Fig. 6.

Novel means are provided for drivably connecting expansible cylinder 33 to feed roller 28 and for reenergizing the driving means therefor by lifting weight 34, whereby said reenergization may be readily accomplished without danger of slippage of the record relative to the recording stylus 23, which slippage would require resetting of the chart to time, and whereby the chart may be quickly and accurately set in proper time relation with respect to the recording stylus. In the form shown, said means includes a male, cone-clutch member 55 slidably mounted on an extended portion of journal 46, which also rotatably supports one end of feed roller 28 (Fig. 4), any suitable means, such as splines or a pin 56, being provided for connecting said clutch member to journal shaft 46 for rotation therewith. Member 55 extends into a conical recess 28a in feed roller 28 and is normally held in frictional driving engagement with the walls of said recess by a coil spring 57. A yielding driving connection is thus provided whereby any tearing of the chart due to excessive stress or tension thereon is obviated.

For the purpose of disconnecting feed roll 28 from the clock or other driving means therefor while the latter is being wound or reenergized, member 55 is provided with a collar 55a which cooperates with a yoke 58 on a pivoted lever 59 that is adapted to be actuated by a rod 60 extending at right angles from said lever and being pivotally connected thereto at 61 (Fig. 4). The other end of rod 60 is pivotally secured to one end of a plate or arm 62 which is pivotally mounted on frame 17a at a point 63 below the axis of rotation of drum 38 and has an opening 62a through which the extended shaft or journal 64 of said drum extends. Thus, when the upper end of arm 62 is moved toward frame 17a, clutch 55, 28a, will be disengaged, thereby releasing the driving connection between cylinder 33 and feed roll 28. To insure the disengagement of said clutch means while weight 34 is being raised to thereby reenergize the driving mechanism, a pair of lugs 65 are provided on shaft 64 in such positions that, when a crank 66 is moved into mesh therewith, arm 62 will be moved by the axial movement of the crank to the dotted line position of Fig. 3 and hence effect disengagement. It will be seen that when crank 66 is moved into mesh with lugs 65 and turned in a counter-clockwise direction, as viewed from the left in Fig. 1, weight 34 will be lifted, cable 36 being thus wound around drum 38 which is rotated relative to shaft 39 by reason of the one-way driving connection constituted by ratchet 40 and pawl 41.

In operation, cylinder 18 is rotated by the rising and falling of float 10 and weight 13 in accordance with the rise and fall of the level of the body of the water supporting said float, and stylus 23 is moved by said grooved cylinder in a manner fully pointed out above. At the same time, chart 24 is unwound from supply roll 26 onto take-up roll 27 by a drive or feed roll 28, the chart being held in close frictional engagement with said feed roll by a friction roll 32. Feed roll 28 and, hence, chart 24 are driven at a constant speed through yielding driving connection 55, 28a by expansible and contractible cylinder 33, which is in turn driven by weight 34 and its associated cable 36. The speed of descent of weight 34 is controlled and maintained constant by escapement device 43 which acts through the one-way driving connection 40, 41 to limit the angular speed of drum 38 to which cable 36 is anchored. In order to vary the speed of driving roller 28 and, hence, the peripheral speed of cylinder 33, the novel construction of said cylinder is utilized. Since weight 34 is constrained to descend at a constant speed, it will be seen that, if the diameter of cylinder 33 is increased by movement of sleeve 51 to the right, the angular velocity thereof will be decreased and, accordingly, advance chart 24 at a decreased speed. Likewise, if sleeve 51 is moved to the left, as seen in Fig. 6, relative to mandrel 46, the diameter of cylinder 33 will be decreased and the angular speed thereof will be increased for a given speed of weight 34. When it is desired to wind or reenergize the clock mechanism, i. e., to lift weight 34, crank 66 is moved into mesh with lugs 65 and turned in the proper direction to wind cable 36 around drum 38. Axial movement of crank 66 into operative position is effective to move arm 62, rod 60, and lever 59 to disengage clutch 55, 28a so that driving roller 28 will be disconnected from the clock mechanism while the latter is being wound, thereby obviating any slippage of chart 24 during the winding operation. If it is desired to set the chart to time after a period of idleness, when putting in a new chart, or for any other reason, this may be readily accomplished by releasing clutch 55, 28a and advancing the chart by manually rotating take-up roll 27.

There is thus provided a novel recording mechanism wherein a chart on which the changing value of a variable is to be plotted against time, is adapted to be driven at a constant speed by constant speed driving means, and wherein novel means are provided for accurately varying the speed of said chart by small amounts independently of the driving force or the speed control means therefor. Additionally, means are provided whereby the chart may be effectively disconnected from the driving means while the latter is being reenergized. Minute variations in the speed of the chart may be readily made for the purpose of making small corrections necessitated by expansion and contraction of the chart under changing conditions of relative humidity or by other conditions. A recording mechanism is also provided which may be readily and quickly adapted for use with charts which have slightly varying scales of graduation.

Although only one embodiment of the invention has been illustrated and described in detail, it is to be expressly understood that the same is not limited thereto but that various changes, such as changes in the design and arrangement of parts illustrated, may be made without departing from the spirit and scope of the invention, as will now be apparent to those skilled in the art. For a definition of the limits of the invention, reference is had primarily to the appended claims.

What is claimed is:

1. In apparatus of the class described, a driven member, and driving means for said member including a rotatable element, a cylinder rotatably drivably connected to said driven member, a cable having one end secured to said element and having a plurality of turns about said element and a single turn about said cylinder, and a free weight secured to the other end of said cable.

2. In apparatus of the class described, a driven member, and driving means for said member including a rotatable element, an expansible and contractible cylinder, means for drivably connecting said cylinder and member, a flexible cable having a plurality of turns about said element and a single turn about said cylinder, means for maintaining said cable under tension to rotate said cylinder and means for symmetrically varying the circumference of said cylinder.

RALPH R. CHAPPELL.
RUTGER B. COLT.